United States Patent
Yavilevich

(10) Patent No.: US 11,516,305 B2
(45) Date of Patent: *Nov. 29, 2022

(54) METHOD AND SYSTEM FOR MONITORING AN ACTIVITY OF A USER

(71) Applicant: CONTENT SQUARE ISRAEL LTD, Ramat Gan (IL)

(72) Inventor: Arik Yavilevich, Ashdod (IL)

(73) Assignee: CONTENT SQUARE ISRAEL LTD, Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,547

(22) Filed: Mar. 8, 2022

(65) Prior Publication Data
US 2022/0191300 A1 Jun. 16, 2022

Related U.S. Application Data

(63) Continuation of application No. 17/575,107, filed on Jan. 13, 2022, now Pat. No. 11,343,339, which is a continuation of application No. 17/506,308, filed on Oct. 20, 2021, now Pat. No. 11,258,870, which is a continuation of application No. 16/931,064, filed on Jul. 16, 2020, which is a continuation of application No. 15/358,842, filed on Nov. 22, 2016, now Pat. No. 10,749,976, which is a continuation of application No. 13/052,729, filed on Mar. 21, 2011, now Pat. No.
(Continued)

(51) Int. Cl.
*H04L 67/50* (2022.01)
*G06Q 30/02* (2012.01)
*G06F 17/00* (2019.01)
*H04L 67/02* (2022.01)

(52) U.S. Cl.
CPC .......... *H04L 67/535* (2022.05); *G06Q 30/02* (2013.01); *H04L 67/02* (2013.01)

(58) Field of Classification Search
CPC ....... H04L 67/535; H04L 67/02; H04L 67/22; G06Q 30/02
USPC ......... 709/203, 202, 224; 715/234, 205, 200
See application file for complete search history.

(56) References Cited

U.S. PATENT DOCUMENTS

| | | |
|---|---|---|
| 5,406,279 A | 4/1995 | Anderson et al. |
| 5,428,785 A | 6/1995 | Morel et al. |

(Continued)

FOREIGN PATENT DOCUMENTS

WO    WO-03073344 A2    9/2003

OTHER PUBLICATIONS

"11687652_IPR2021-00464_525 Jan. 29, 2021 003 PET Petition_as filed", (Jan. 29, 2021), 101 pages.
(Continued)

*Primary Examiner* — Manglesh M Patel
(74) *Attorney, Agent, or Firm* — Schwegman Lundberg & Woessner, P.A.

(57) ABSTRACT

A method for tracking an activity of a user. The method includes receiving, by a tracking element, compressed user activity information representative of activities performed by the user during a visit to a web page; receiving, by the tracking element, web page content information representative of web page content displayed to the user during the visit; decompressing the compressed user activity information; and generating user visit information by the tracking element.

23 Claims, 12 Drawing Sheets

Related U.S. Application Data 9,508,081, which is a continuation of application No. 11/687,652, filed on Mar. 18, 2007, now Pat. No. 7,941,525.

(60) Provisional application No. 60/767,570, filed on Aug. 24, 2006, provisional application No. 60/767,481, filed on Apr. 1, 2006.

(56) References Cited

U.S. PATENT DOCUMENTS

| | | | |
|---|---|---|---|
| 6,108,637 A | 8/2000 | Blumenau | |
| 6,112,240 A | 8/2000 | Pogue et al. | |
| 6,133,912 A * | 10/2000 | Montero | H04N 21/4622 348/559 |
| 6,182,097 B1 | 1/2001 | Hansen et al. | |
| 6,199,077 B1 | 3/2001 | Inala et al. | |
| 6,205,413 B1 | 3/2001 | Bisdikian et al. | |
| 6,341,310 B1 | 1/2002 | Leshem et al. | |
| 6,345,307 B1 | 2/2002 | Booth | |
| 6,505,201 B1 | 1/2003 | Haitsuka et al. | |
| 6,549,944 B1 | 4/2003 | Weinberg et al. | |
| 6,662,226 B1 | 12/2003 | Wang et al. | |
| 6,677,868 B2 | 1/2004 | Kerofsky et al. | |
| 6,877,007 B1 * | 4/2005 | Hentzel | G06Q 30/02 709/224 |
| 6,895,437 B1 | 5/2005 | Cowdrey et al. | |
| 6,944,660 B2 | 9/2005 | Eshghi et al. | |
| 6,963,874 B2 | 11/2005 | Kasriel et al. | |
| 7,231,606 B2 | 6/2007 | Miller et al. | |
| 7,299,281 B1 | 11/2007 | Wang et al. | |
| 7,484,182 B1 * | 1/2009 | Smith | G06F 3/0481 715/815 |
| 7,500,200 B2 | 3/2009 | Kelso | |
| 7,523,191 B1 | 4/2009 | Thomas et al. | |
| 7,526,530 B2 | 4/2009 | Thomason | |
| 7,584,435 B2 * | 9/2009 | Bailey | G06F 16/958 715/764 |
| 7,610,276 B2 | 10/2009 | Yomtobian | |
| 7,685,296 B2 | 3/2010 | Brill et al. | |
| 7,872,640 B2 | 1/2011 | Lira | |
| 7,904,596 B1 | 3/2011 | Wang et al. | |
| 7,941,525 B1 | 5/2011 | Yavilevich | |
| 8,275,909 B1 | 9/2012 | Rothstein | |
| 8,832,055 B1 | 9/2014 | Zwicky et al. | |
| 8,904,044 B2 | 12/2014 | Ebling et al. | |
| 9,154,365 B1 * | 10/2015 | Henry | H04L 29/08072 |
| 9,384,204 B2 | 7/2016 | Gupta | |
| 9,508,081 B2 | 11/2016 | Yavilevich | |
| 10,205,623 B2 | 2/2019 | Error et al. | |
| 10,749,976 B2 | 8/2020 | Yavilevich | |
| 11,100,069 B2 | 8/2021 | Harris et al. | |
| 11,258,870 B1 | 2/2022 | Yavilevich | |
| 2001/0037205 A1 | 11/2001 | Joao et al. | |
| 2001/0044855 A1 | 11/2001 | Vermeire et al. | |
| 2002/0065826 A1 | 5/2002 | Bell et al. | |
| 2002/0143931 A1 | 10/2002 | Smith et al. | |
| 2002/0147805 A1 | 10/2002 | Leshem et al. | |
| 2002/0165954 A1 | 11/2002 | Eshghi et al. | |
| 2002/0188694 A1 | 12/2002 | Yu | |
| 2003/0023511 A1 | 1/2003 | Donald, Sr. et al. | |
| 2003/0023715 A1 | 1/2003 | Reiner et al. | |
| 2003/0083938 A1 | 5/2003 | Smith et al. | |
| 2003/0130982 A1 | 7/2003 | Kasriel et al. | |
| 2003/0145140 A1 * | 7/2003 | Straut | G06Q 30/06 710/33 |
| 2003/0179113 A1 | 9/2003 | Apostolopoulos et al. | |
| 2003/0231196 A1 | 12/2003 | Keohane et al. | |
| 2004/0003248 A1 | 1/2004 | Arkhipov | |
| 2004/0010543 A1 | 1/2004 | Grobman | |
| 2004/0015580 A1 | 1/2004 | Lu et al. | |
| 2004/0015714 A1 | 1/2004 | Abraham et al. | |
| 2004/0054715 A1 | 3/2004 | Cesario | |
| 2004/0103215 A1 | 5/2004 | Ernst et al. | |
| 2004/0172389 A1 | 9/2004 | Galai et al. | |
| 2004/0199584 A1 | 10/2004 | Kirshenbaum et al. | |
| 2005/0071760 A1 | 3/2005 | Jaeger | |
| 2005/0102358 A1 | 5/2005 | Gold et al. | |
| 2005/0120024 A1 | 6/2005 | Tharpe et al. | |
| 2005/0177401 A1 * | 8/2005 | Koeppel | G06Q 30/0201 705/4 |
| 2005/0192863 A1 | 9/2005 | Mohan | |
| 2006/0064646 A1 | 3/2006 | Kelso et al. | |
| 2006/0095558 A1 | 5/2006 | Christian | |
| 2006/0195784 A1 * | 8/2006 | Koivisto | G06F 40/143 715/244 |
| 2007/0050844 A1 * | 3/2007 | Lebel | G06F 11/3466 726/13 |
| 2007/0124288 A1 | 5/2007 | Swanson et al. | |
| 2007/0198634 A1 | 8/2007 | Knowles et al. | |
| 2008/0046562 A1 * | 2/2008 | Butler | G06F 16/958 709/224 |
| 2008/0059571 A1 | 3/2008 | Khoo | |
| 2008/0077561 A1 | 3/2008 | Yomtobian | |
| 2009/0203352 A1 | 8/2009 | Ferdon et al. | |
| 2011/0107241 A1 | 5/2011 | Moore | |
| 2011/0213822 A1 | 9/2011 | Yavilevich | |
| 2017/0078419 A1 | 3/2017 | Yavilevich | |
| 2020/0351363 A1 | 11/2020 | Yavilevich | |
| 2022/0038549 A1 | 2/2022 | Yavilevich | |
| 2022/0141300 A1 | 5/2022 | Yavilevich | |

OTHER PUBLICATIONS

"11687652_IPR2021-00464_525 May 10, 2021 012 PO Preliminary Response", (May 10, 2021), 36 pages.

"11687652_IPR2021-00464_525 Jul. 19, 2021 021 Decision Granting Institution", (Jul. 19, 2021), 38 pages.

"13052729_IPR2021-00363_081 Dec. 31, 2020 003 PET Petition_as filed", (Dec. 31, 2020), 97 pages.

"13052729_IPR2021-00363_081 Apr. 22, 2021 011 PO Preliminary Response", (Apr. 22, 2021), 49 pages.

"13052729_IPR2021-00363_081 Jul. 19, 2021 023 Decision Granting Institution", (Jul. 19, 2021), 51 pages.

"U.S. Appl. No. 11/687,652, Applicants Summary of Examiner Interview filed Dec. 23, 2010", (Dec. 23, 2010), 1 page.

"U.S. Appl. No. 11/687,652, Examiner Interview Summary dated Dec. 23, 2010", 3 pgs.

"U.S. Appl. No. 11/687,652, Final Office Action dated Oct. 7, 2010", 21 pgs.

"U.S. Appl. No. 11/687,652, Non Final Office Action dated Apr. 15, 2010", 19 pgs.

"U.S. Appl. No. 11/687,652, Notice of Allowance dated Feb. 3, 2011", 10 pgs.

"U.S. Appl. No. 11/687,652, Response filed Feb. 17, 2010 to Restriction Requirement dated Jan. 6, 2010", 2 pgs.

"U.S. Appl. No. 11/687,652, Response filed Jul. 15, 2010 to Non Final Office Action dated Apr. 15, 2010", 15 pgs.

"U.S. Appl. No. 11/687,652, Response filed Dec. 23, 2010 to Final Office Action dated Oct. 7, 2010", 17 pgs.

"U.S. Appl. No. 11/687,652, Restriction Requirement dated Jan. 6, 2010", 6 pgs.

"U.S. Appl. No. 13/052,729, Final Office Action dated Jul. 9, 2015", 7 pgs.

"U.S. Appl. No. 13/052,729, Final Office Action dated Dec. 19, 2014", 8 pgs.

"U.S. Appl. No. 13/052,729, Non Final Office Action dated Jun. 23, 2014", 8 pgs.

"U.S. Appl. No. 13/052,729, Non Final Office Action dated Dec. 21, 2015", 7 pgs.

"U.S. Appl. No. 13/052,729, Notice of Allowance dated Jul. 29, 2016", 7 pgs.

"U.S. Appl. No. 13/052,729, Preliminary Amendment filed Mar. 21, 2011", 9 pgs.

"U.S. Appl. No. 13/052,729, Response filed Apr. 18, 2016 to Non Final Office Action dated Dec. 21, 2015", 13 pgs.

"U.S. Appl. No. 13/052,729, Response filed May 18, 2015 to Final Office Action dated Dec. 19, 2014", 8 pgs.

(56) References Cited

OTHER PUBLICATIONS

"U.S. Appl. No. 13/052,729, Response filed Sep. 22, 2014 to Non Final Office Action dated Jun. 23, 2014", 12 pgs.
"U.S. Appl. No. 13/052,729, Response filed Dec. 3, 2015 to Final Office Action dated Jul. 9, 2015", 12 pgs.
"U.S. Appl. No. 15/358,842, Final Office Action dated Sep. 21, 2018", 8 pgs.
"U.S. Appl. No. 15/358,842, Non Final Office Action dated Mar. 8, 2018", 8 pgs.
"U.S. Appl. No. 15/358,842, Non Final Office Action dated Mar. 19, 2020", 7 pgs.
"U.S. Appl. No. 15/358,842, Non Final Office Action dated May 16, 2019", 11 pgs.
"U.S. Appl. No. 15/358,842, Notice of Allowance dated Apr. 22, 2020", 8 pgs.
"U.S. Appl. No. 15/358,842, Preliminary Amendment filed Nov. 22, 2016", 7 pgs.
"U.S. Appl. No. 15/358,842, Response filed Feb. 21, 2019 to Final Office Action dated Sep. 21, 2018", 10 pgs.
"U.S. Appl. No. 15/358,842, Response filed Mar. 25, 2020 to Non Final Office Action dated Mar. 19, 2020", 3 pgs.
"U.S. Appl. No. 15/358,842, Response filed Aug. 7, 2018 to Non Final Office Action dated Mar. 8, 2018", 11 pgs.
"U.S. Appl. No. 15/358,842, Response filed Aug. 16, 2019 to Non Final Office Action dated May 16, 2019", 7 pgs.
"U.S. Appl. No. 16/931,064, Preliminary Amendment filed Jul. 16, 2020", 6 pgs.
"U.S. Appl. No. 17/506,308, Corrected Notice of Allowability dated Jan. 20, 2022", 2 pages.
"U.S. Appl. No. 17/506,308, Notice of Allowance dated Jan. 6, 2022", 7 pages.
"U.S. Appl. No. 17/575,107, Non Final Office Action dated Mar. 16, 2022".
"U.S. Appl. No. 17/575,107, Notice of Allowance dated Apr. 19, 2022".
"U.S. Appl. No. 17/575,107, Response filed Mar. 24, 2022 to Non Final Office Action dated Mar. 16, 2022", 10 pgs.
Albanese, Massimilano, et al., "Web Personalization Based on Static Information and Dynamic User Behavior", ACM WIDM 2004, Washington, DC, (Nov. 12-13, 2004).
Atterer, Richard, et al., "Knowing the User's Every Move—User Activity Tracking for Website Usability Evaluation and Implict Interaction", ACM, WWW 2006, Edinburgh, Scotland, (May 23-26, 2006).
Card, Stuart K, et al., "Information Scent as a Driver of Web Behavior Graphs: Results of a Protocol Analysis Method for Web Usability", ACM, CHI 2001, Seattle, WA, USA, (Mar. 31-Apr. 4, 2001).
Hong, Jason I, et al., "WebQuilt: A Proxy-based Approach to Remote Web Usability Testing", ACM Transactions on Information Systems, vol. 19, No. 3, (Jul. 2001), 263-285.
Lister, Mike, et al., "Usability Testing Software for the Internet", Conference on Computer Human Interaction 2001 [CHI 2001], Seattle, Washington, (Apr. 5, 2001).
Mueller, Florian, et al., "Cheese: Tracking Mouse Movement Activity on Websites, a Tool for User Modeling", CHI 2001, (Mar. 31-Apr. 5 CHI 2001).
Reeder, Robert W, et al., "WebLogger: A Data Collection Tool for Web-use Studies", PARC Technical Report 2000, UIR—Jun. 2000.
Srivastava, Jaideep, et al., "Web Usage Mining: Discovery and Applications of Usage Patterns from Web Data", Sigkdd Explorations, vol. 1, Issue 2, (Jan. 1, 2000), 12-23.
Yavilevich, et al., "Method and System for Monitoring an Activity of a User", Declaration of Dr. Jeremy Cooperstock, U.S. Pat. No. 7,941,525, May 10, 2011.

\* cited by examiner

```
<script src="http://operator.com/WR.js" type="text/javascript"></script>
<script type="text/javascript">
WebRecorder("3");
</script>
```

Figure 2

```
var s=document.createElement("script");
s.src="http://operator.com/WRMain.js";
document.body.appendChild(s);
```

Figure 3

```
function WRAddEvent(e, t, fn)
{
    if (e.addEventListener)
        e.addEventListener(t, fn, false);
    else if (e.attachEvent)
        e.attachEvent('on' + t, fn);
}
```

Figure 4

```
function WRRequest(data)
{
    // send
    var i = new Image(1, 1);
    i.src="http://operator.com/r?"+data+WRGetRandToken();
    i.onload=function() { WRMessageSent(); } // this makes
the image finish     // downloading. an alternative to storing
in an array with ImgArray.push(i);
}

// Get rand token
function WRGetRandToken()
{
    return Math.floor(Math.random()*1000000000);
}

// Callback for onload of images
function WRMessageSent()
{
}
```

Figure 5

METHOD AND SYSTEM FOR MONITORING AN ACTIVITY OF A USER

RELATED APPLICATIONS

The present application is a continuation of U.S. Application Ser. No. 17/575,107, filed Jan. 13, 2022, which is a continuation of U.S. application Ser. No. 17/506,308, filed Oct. 20, 2021, which is a continuation of U.S. application Ser. No. 16/931,064, filed Jul. 16, 2020, which is a continuation of U.S. application Ser. No. 15/358,842, filed Nov. 22, 2016, which is a continuation of Ser. No. 13/052,729, filed Mar. 21, 2011, which is a divisional application of U.S. application Ser. No. 11/687,652, which claims priority from U.S. Provisional Application Ser. No. 60/767,481, filed Apr. 1, 2006 and from U.S. Provisional Ser. No. 60/767,570 filed Aug. 24, 2006, each of which is hereby incorporated by reference in its entirety.

BACKGROUND OF THE INVENTION

The Internet is a collection of disparate computer systems which use a common protocol to communicate with each other. A common use of the Internet is to access World Wide Web (web) pages. Web pages are typically stored on a server and remotely accessed by a client over the Internet using a web browser.

A web site is a collection of web pages. A web site includes typically a home page and a hierarchical order of follow on web pages that are accessible through the home page. The web pages are connected to each other using hypertext links. The links allow a user to browse web pages of a web site by selecting the links between the web pages. Distinct Web sites may be respectively identified by respective distinct associated Internet domain names.

To increase user visitations and revenue, web sites have become very sophisticated. Web sites typically include web pages that provide information to users, advertise products or services to users and/or provide site search functions for users. A problem for web site owners is to determine how successful the web site is, for example, whether the informational or other needs of users are met and whether the users are purchasing advertised goods and services.

Programs for analyzing traffic on a network server, such as a worldwide web server, are known in the art. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc. Alternatively, data is logged on the web server that is being monitored and the logs are transferred to another computer, where they are compiled and analyzed.

Alternatively, web sites use client-side script, such as javascript, which is embedded into the web pages to monitor traffic. Such a script can collect information and submit it to the server where the information is analyzed and stored. The benefits of using a client-side script are that: cached visits, such as BACK button navigation, can be monitored; and that non-human ("robot") traffic is not monitored, since robots don't normally execute the client side code which is referenced or embedded inside a web page.

Analyzing activity on a worldwide web server from a different location on a global computer network (such as "Internet") is also known in the art. To do so, a provider of remote web-site activity analysis ("service provider") generates javascript code that is distributed to each subscriber to the service ("subscriber" herein). The subscriber copies the code into each web-site page that is to be monitored. When a visitor to the subscriber's web site ("client" or "visitor") loads one of the web-site pages into his or her computer, the javascript code collects information, including time of day, referring page, page visited, etc. The code then calls a server operated by the service provider—also located on the network—and transmits the collected information thereto as a URL parameter value. Information is also transmitted in a known manner via a cookie.

Each subscriber has a password to access a page on the service providers server. This page includes a set of tables that summarize—possibly in real time—the activity on the subscriber's web site.

Because of limitations in javascript browser technology, special, non-trivial, techniques are used to transmit the information when the recipient is located in a different domain than the web server on which the web site is located. Such techniques usually add the information which has to be transferred, to an http request for an image or some other web resource. This resource is located on the server of the service provider and as a result the request arrives there and not to the web server storing the web site. This is in contrast to more straight forward techniques available for sending data to the web server on which the web site is located; such as XMLHttpRequest which is a standard method for submitting data to a web server known to those skilled in the art. It should be clarified that whenever a third-party service operator is involved, it usually means that a cross domain operation has to be supported.

Modern web site traffic analysis tools have been useful for tracking page-to-page navigation, e.g., where a visitor downloads one page and then clicks a link to transition to another page. Each click of a link causes the web browser to send a request over the Internet for the new web page, which is then downloaded from the web page server storing the web page and loaded within the browser running on the visitor's computer. The operation of conventional browsers such as Microsoft's Internet Explorer and Netscape Navigator are well known in the art. The active javascript within these pages reports back information every time a new page is loaded into the visitor computer's web browser.

Additional methods which include installation of executable routines on the visitor computer have been adopted in the past to monitor activities on computers, all with varying amounts of success. For example, Microsoft has developed Browser Helper Objects, which are a particular type of ActiveX® components, that can be adopted for monitoring purposes in Microsoft's Internet Explorer browser. (ActiveX® is a registered trademark of Microsoft Corporation, Redmond, Wash.). However, utilization of ActiveX® routines requires these executable routines be downloaded permanently onto a user's browser and further requires the user's affirmative response to a prompt requesting authorization to install the software. If the user declines, the activity of targeted web-based pages and transactions cannot be monitored, and the developer of such pages and transactions is limited regarding the amount of relevant data that can be recorded and evaluated to improve performance.

Developers have also coded and inserted monitoring applets within web pages to run on user browsers to monitor the performance of the browser while the pages are active on the browser. However, such applets generally can measure performance events only within the page in which the applet was embedded and therefore have limited value monitoring such browser-level events as navigating to a new page or page access aborts. Furthermore, because of limitations in browser technology, any data gleaned during these page applet-based monitoring functions can only be sent back to the web server originating the web page. Such a limitation imposes additional network communications load between the browser and the web server and adds processing load to the web server that must receive and somehow process the monitoring data. Additionally, should the web server go down or should the connection between the browser and the web server be lost following the download of the page to the browser, any monitoring data will likely be lost.

Due to limitations of applets and ActiveX® controls, the preferred method to collect information about the visitor on the client side is client-side script, such as javascript. Javascript is allowed by default in most browsers and doesn't require an authorization from the user in order to be executed. However, it should be noted that an authorization can be requested, if desired, from the user before performing any javascript operation.

Prior art publication limit the information collected on the client side to "per-page" data such as: url, referrer, load time, ip, browser type, screen resolution, etc. This "per-page" data resembles data that was previously collected on the server side, in the form of web logs. A web server only knows about page requests and so web logs only contain "per-page" data. Client-side data collection is not limited to "per-page" data, but evolved as such since at the beginning it was developed as a replacement for traditional server logs. For example, data accessible to client-side scripts includes but not limited to: mouse movement, scrolling of web page, resizing of browser window, click events, keyboard use etc. ("per-action" data).

Additionally, prior art publications often assume a linear model of web browsing, where a visitor goes from web page A to web page B to web page C. Where in reality, a visitor may open several windows, and then switch from one to another in any way they like. Such linear model originates in the linear nature of web server logs from which traffic analysis evolved. A result of this linear model is that the time a visitor spends on a web page is measured as the time that passes from the load event to the unload event. However, this time usually doesn't represent the real time a user spent interacting with the page but rather the time the page was open.

Web site owners are increasingly interested in information about their visitors. Most web sites employ traditional methods and, hence, to compete they must find new ways to gather insights about how their users interact with their web sites.

Another option available to web site owners is to conduct web usability testing. This is done similarly to beta testing of software. Usually, people are paid to use the web site and their actions and feedback are recorded with special software and hardware. Such processes usually take place in special labs designed for it. The disadvantage of this "active" approach is that it is expensive and that users might behave differently than when they aren't monitored. It should be noted, that the retail and supermarket industries regularly use both active and passive methods to analyze customer behavior.

The following U.S. patents and patent applications provide a brief description of some prior art monitoring solutions: U.S. Pat. No. 6,112,240 of Pogue et al., U.S. patent application publication serial number 2002/0143931 of Smith et al., and U.S. patent application publication serial number 2004/0054715 of Cesario and U.S. Pat. No. 6,944,660 of Eshghi et al.

Accordingly, it would be desirable to provide a system and method for tracking and analyzing web site traffic which will be: client side based, support cross-domain operation and will collect information beyond traditional "per-page" data.

SUMMARY OF THE INVENTION

1. A method for tracking an activity of a user, the method includes: (a) downloading, over a network, web page content that comprises a tracking code; b) tracking, at least partially by executing the tracking code by a user computer, user activities that are responsive to at least a portion of the downloaded web page content, wherein the tracking comprises generating user activity information; (c) compressing and buffering a portion of the user activity information; and (d) transmitting to a tracking entity, at least a compressed portion of the user activity information when a first transmission criterion is fulfilled. 2. A method for tracking an activity of a user, the method includes: (a) receiving, by a tracking element, compressed user activity information representative of activities performed by the user during a visit to a web page; (b) receiving, by the tracking element, web page content information representative of web page content displayed to the user during the visit; (c) decompressing the compressed user activity information; and (d) generating user visit information by the tracking element, in response to the user activity information and in response to the web page content information. 3. A computer program product of a computer readable medium usable with a programmable computer, the computer program product having computer-readable code embodied therein for tracking an activity of a user, the computer-readable code comprising instructions for: downloading, over a network, web page content that comprises a tracking code; tracking, at least partially by executing the tracking code by a user computer, user activities that are responsive to at least a portion of the downloaded web page content, wherein the tracking comprises generating user activity information; compressing and buffering a portion of the user activity information; and transmitting to a tracking entity, at least a compressed portion of the user activity information when a first transmission criterion is fulfilled. 4. A computer program product of a computer readable medium usable with a programmable computer, the computer program product having computer-readable code embodied therein for tracking an activity of a user, the computer-readable code comprising instructions for: receiving, by a tracking element, compressed user activity information representative of activities performed by the user during a visit to a web page; receiving, by the tracking element, web page content information representative of web page content displayed to the user during the visit; decompressing the compressed user activity information; and generating user visit information by the tracking element, in response to the user activity information and in response to the web page content information. 5. A system for tracking an activity of a user, the system includes: (a) an interface, adapted to receive compressed user activity information representative of activities performed by the user during a visit to a web page, and to receive web page content information representative of web page content displayed to the user during the visit; and (b) a processor, adapted to decompress the compressed user activity information and to generate user visit information in response to the user activity information and in response to the web page content information.

BRIEF DESCRIPTION OF DRAWINGS

The invention may be best understood by reference to the following detailed description of the invention, which describes certain exemplary embodiments of the invention, taken in conjunction with the accompanying drawings in which:

FIGS. 2-5 illustrates exemplary script formats, according to various embodiments of the invention;

DETAILED DESCRIPTION OF THE DRAWINGS

Figure 1A:
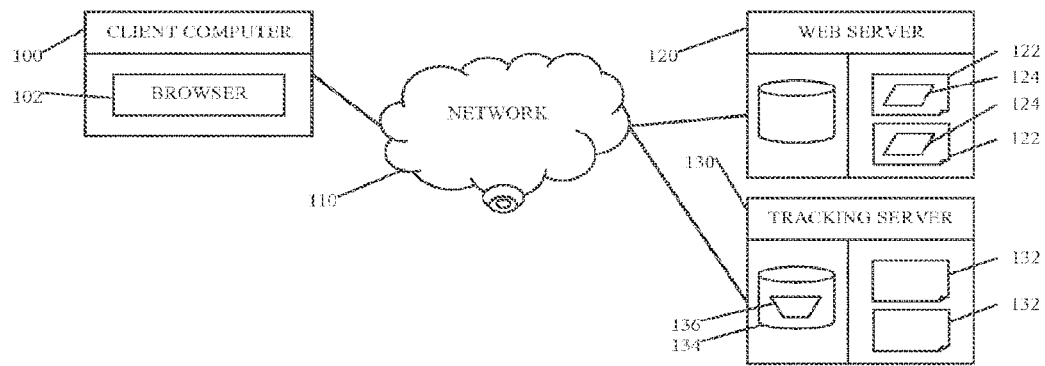
FIGS. 1A-ID illustrate a monitoring system and its environment, according to an embodiment of the invention.

While this invention is susceptible of embodiments in many different forms, there is shown in the drawings and will herein be described in detail specific embodiments, with the understanding that the present disclosure is to be considered as an example of the principles of the invention and not intended to limit the invention to the specific embodiments shown and described.

Conveniently a tracking system is provided. The tracking system can be a tracking server such as tracking server 130 but this is not necessarily so. The tracking system includes an interface, adapted to receive compressed user activity information representative of activities performed by the user during a visit to a web page, and to receive web page content information representative of web page content displayed to the user during the visit; and a processor, adapted to decompress the compressed user activity information and to generate user visit information in response to the user activity information and in response to the web page content information.

Conveniently, the processor is adapted to compensate for difference between a visual representation, on a tracking display, of the web page and between a visual representation of the web page on another display.

Conveniently, the processor is adapted to compensate in response to relative locations of visual elements of the web page.

Conveniently, the processor is adapted to apply a non-linear transformation on the visual representation, on the tracking display, of the web page.

Conveniently, the processor is adapted to download the web page content information from an information source that provided web page information to the user during the visit of the user.

Conveniently, the processor is adapted to download the web page content information from an information source that differs from an information source that provided to the user web page information the visit of the user.

FIG. 1A illustrates a client computer 100 that can execute a browser 102, one web server 120 operated by a subscriber and one tracking server 130 that is operated by a service-provider. Web server 120 is connected to tracking server 130 and both are connected to client computer 100 over network 110 such as Internet, LAN or WAN.

Figure 1B:
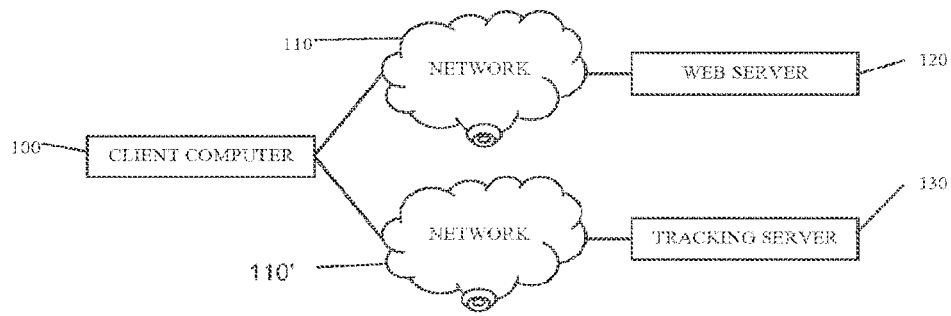
Figure 1C:
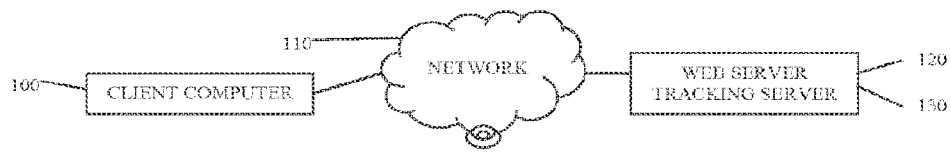
Figure 1D:
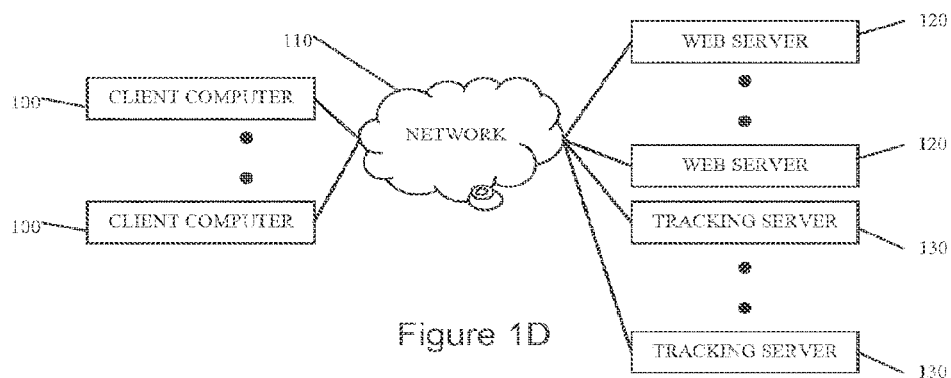

FIG. 1B illustrates a scenario in which web server 120 is connected to the client computer 100 via network 110 while tracking server 130 is connected to client computer 100 via network 110'. FIG. 1C illustrates a scenario in which web server 120 and tracking server 130 are integrated. FIG. 1D illustrates multiple client computers that are connected via network 110 to multiple web servers and multiple tracking servers. It is noted that the multiple client computers can be connected to the various web servers and/or tracking servers via multiple networks.

Referring back to FIG. 1A, tracking code such as script 124 is embedded in a web page 122. FIG. 2 illustrates an example for script 124. It is noted that a web site can include multiple web pages, each including their own script. For simplicity of explanation two web pages and two scripts were shown.

It is noted that script 124 can include a portion of a tracking code while the other portion of the tracking code is downloaded to a client computer in response to an execution of script 124. Script 124 can reference one or more external script files 132 that can also be regarded as part of the tracking code. Conveniently, the so-called external script files are located on tracking server 130. It is noted that these external script files can be located elsewhere or be embedded into the web page 122.

In response to a request from client computer 100 to download web page 122 (using browser 102), the web server 120 returns web page 122 to the client 100 with script 124.

A user can visit a web site that includes one or more web pages. While a web page is displayed the user can perform various activities that are monitored by the tracking code. Conveniently, an interaction of a user with one web page is referred to as a session. User activities during a visit to a web site that are related to a certain web page define a session.

The tracking code, such as script 124 and/or script file 132, may start executing automatically or wait for an instruction from some other piece of script in the web page 122.

The tracking code, such as script 124 and/or script file 132, can decide whether to track activities of a user or not. Such a decision can be responsive to predefined parameters, a result of a random process, or a combination thereof.

The predefined parameter can be responsive to a session parameter such as page URL, referring page URL, IP, time zone, browser type, whether the user is a returning user (to the web page and/or to the web site), what is the credit available to the subscriber, specific user action and the like.

Conveniently, if the tracking code decided to track the user it can retrieve another part of the tracking code, for example it can retrieve (or otherwise receive) another script that includes instructions that support the main functionality of the tracking process. FIG. 3 illustrates such a script.

It is noted that the tracking code can be split in various manners, in view to the size of the script, in view to the functionality of different parts of the script and the like.

FIG. 4 illustrates a script that monitors client activities, after the decision to track the user session was made.

According to an embodiment of the invention user activity information, web page information, and client computer related information can be transmitted to tracking server 130 in different manners. For example, web page information or client computer information (such as a web page identifier, URL, referrer, browser type, platform type, screen resolution and depth, page load start time, initialization start time, time zone, user identifier, system capabilities (plug-ins, cookies, Flash®)) can be transmitted in a non-compressed (or a compressed) format, even before a transmission of user activity information. It is noted that the order of transmission can differ.

Conveniently, the tracking code waits for user activities and in response to these activities compresses and buffers user activity information, and selectively transmits the compressed user activity information. The compression and buffering reduces the bandwidth and overhead associated with the transmission of the user activity information over a network such as network 110. It is noted that highly detailed user activity information is acquired, and in order to limit the overall resources (such as bandwidth) allocated to the transmission of user activity information (especially when a large amount of users is monitored) compression (encoding) and buffering are used.

Conveniently a variable length compression and encoding scheme is used. Shorter code-words represent more frequently occurring events. The codebook can be generated in response to expected user activities, to previously monitored user transmissions and the like. Conveniently, shorter codewords are assigned to mouse movement actions (assigning for example, a one letter codeword), scrolling, keyboard strikes, etc. Conveniently, only differences between current and previous values (such as coordinates, numeric values entered by the user) are transmitted. Yet for another embodiment of the invention the compression includes representing numerical values in a base that is larger than ten, such as 64 base (which is suited for transmission as part of a HTTP GET URL). Thus, larger numbers are defined by fewer bits. Yet according to another embodiment of the invention the compressing includes encoding sign and length of parameters in the operation code of the event, such that there may be several codes for a mousemove event depending on the values of the parameters, and the like. Other video and/or audio compression techniques can be applied.

The transmission overhead is also reduced by buffering. Each transmission of user activity information over network 100 is associated with a certain overhead. By buffering user activity information relating to multiple events and encapsulating user activity information related to multiple events within a single message, packet or frame, the amount of transmitted information is reduced.

The transmission can occur when a transmission criteria is fulfilled. The transmission criteria can be responsive to: the buffer exceeding a certain size limit, a certain amount of time has passed from the last transmission, an occurrence of a prioritized or highly interesting event, and the like.

Conveniently, a transmission can occur immediately, once an interesting event has been received, one would incur the overhead per each such event. Additionally it would be preferable to send the buffer immediately on such events such as unload, click or on initialization.

Conveniently, the user activity information as well as other types of information are transmitted in messages. A message typically includes a message number. According to an embodiment of the invention the last message that is associated with a session includes an end of session indication.

It is noted that user activities (also referred to as events) can include, for example: load, unload, scroll, mousemove, mousedown, mouseup, click, resize, keydown, keypress, keyup, paste, mouseleave, mouseenter, activate, deactivate, focus, blur, select, selectstart, submit, error, abort, etc.

Conveniently, each event is associated with multiple properties or attributes. These properties can be transmitted together with the event. For example: mouse events are transmitted with x, y coordinates of the cursor and the state of the mouse buttons; keyboard events are transmitted with the key that was pressed; scroll events are transmitted with the position of the scroll bars; resize events are transmitted with the new window size; click events are transmitted with the type and URL of the object or link that was clicked on. It is preferable that each event is transmitted with the time it occurred at. The time can be absolute or relative to a known previously transferred time, such as load time.

Additional information that may be transmitted by the tracking code may include checksums and cryptographic hashes of various data in the web page. Checksums may include, but not limited to, CRC, CRC32, and Fletcher checksum algorithms and the hashes may include, but not limited to, SHA-1, and MD4 hash algorithms. Web page data that will function as a source for those algorithms may include, but not limited to, innerHtml and value properties of various DOM elements. This checksum and hash data is desired because it may simplify the web page caching process that will be explained later.

Since it is desired that the tracking server 130 could be a third party server on a different domain than the web server 120, a special technique is suggested to send data (such as web page content information) which is not limited by cross domain scripting limitation. The data to be sent is appended to a URL of a resource on the tracking server 130 and a request to the resulting URL is sent.

FIG. 5 describes a piece of code that can perform the request. Other manners can include changing src attribute of an <img> tag or calling document.write to write a <img> tag or some other tag that issues a HTTP request. Unlike alternative methods, the method suggested in FIG. 5 has no visual effects on the web page. Additionally, the URL should contain at least one random component to prevent any sort of caching by the network 110, browser 102 or web server 120.

Figure 8A:
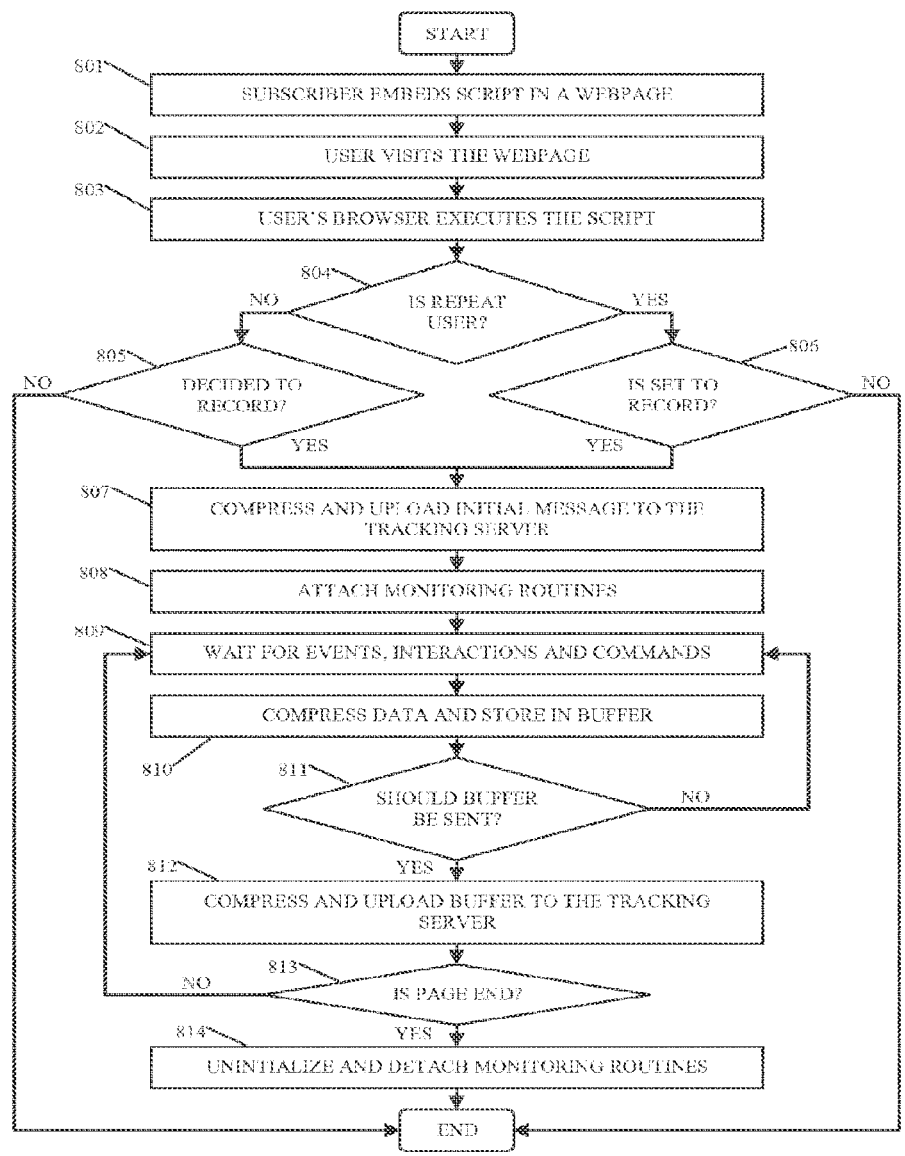
FIGS. 8A, 8B, 9A and 9B illustrate methods for recording visits to a web site, according to an embodiment of the invention.
Figure 8B:
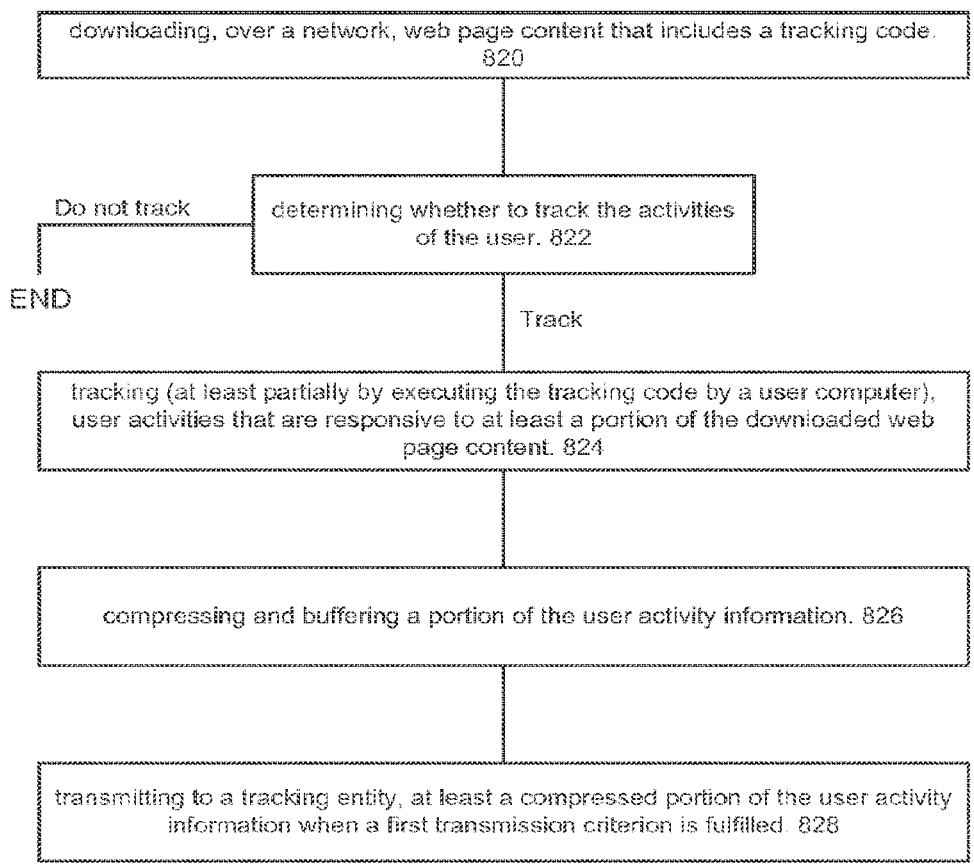

FIGS. 8A-8B illustrates methods 800 and 800' for tracking activities of a user, according to an embodiment of the invention.

FIG. 8A illustrates stage 801 of "subscriber embeds script in web page". This is a preliminary stage that is executed at the web server and is not an integrated part of method 800 that is executed (at least mainly) by a client computer.

Method 800' starts by stage 820 of downloading, over a network, web page content that includes a tracking code. It is noted that initially only a part of the tracking code is downloaded during stage 820 and that other parts of a tracking code can be downloaded in response to the execution of the initially downloaded tracking code. Stage 820 conveniently includes stage 802 during which the user visits a certain web page.

Stage 820 can include a sequence of stages that occur due to the execution of the tracking code. This is illustrated by box 803 of "user's browser executed the script". For simplicity of explanation box 803 is followed by box 804 (as well as other boxes) although these boxes can be included within box 803.

Stage 820 is followed by stage 822 of determining whether to track the activities of the user. For simplicity of explanation FIG. 8 illustrates an exemplary scenario in which the determination is responsive to previous visits of the user (as illustrated by query box 804 in which the tracking criterion is responsive to whether the user is a repeat user of the web page), but other considerations can be taken into account, as illustrated in some of the preceding pages. If the user is a repeat user then stage 804 is followed by stage 806 of determining whether the system is set to track (record) the activities of the user. If the user is not a repeat user then stage 804 is followed by stage 805 in which other tracking criterions can be evaluated. If the answer is positive in either one of stage 805 and 806 then method 800 proceeds to stage 807.

Stage 822 is followed (if deciding to track) by stage 824 of tracking (at least partially by executing the tracking code by a user computer), user activities that are responsive to at least a portion of the downloaded web page content. Stage 824 includes generating user activity information.

Stage 824 is followed by stage 826 of compressing and buffering a portion of the user activity information. It is noted that the whole user activity information can be buffered and compressed but this is not necessarily so.

Stage 826 is followed by stage 828 of transmitting to a tracking entity, at least a compressed portion of the user activity information when a first transmission criterion is fulfilled.

Conveniently, stages 824-826 include stages 807-814.

Stage 807 includes compressing and transmitting an initial message to the tracking server. The initial message can include, for example, web page information or client computer information. Thus, once a second transmission criterion is fulfilled (generation of web page information or client computer information) the transmission occurs.

Stage 807 is followed by stage 808 of attaching monitoring routines that track user activities.

Stage 808 is followed by stage 809 of waiting for events, interactions and commands (collectively denoted events). These events can be predefined by the tracking code and once they occur user activity information is generated. It is noted that user activities (also referred to events) can include, for example: load, unload, scroll, mousemove, mousedown, mouseup, click, resize, keydown, keypress, keyup, paste, mouseleave, mouseenter, activate, deactivate, focus, blur, select, selectstart, submit, error, abort, etc. It is further noted that each event is associated with multiple properties or attributes.

Stage 809 is followed by stage 810 of compressing user activity information and storing the compressed user activity information in a buffer. Stage 810 is followed by query stage 811 of determining whether the buffered user activity information should be transmitted thus evaluating whether the first transmission criterion was fulfilled. If the answer is positive then stage 811 is followed by stage 812 of transmitting the compressed user activity information to a tracking entity, else stage 811 is followed by stage 809.

Stage 812 is followed by stage 813 of checking whether the web page session ended (for example by checking for the unload event) and if the answer is positive stage 813 is followed by stage 814 of uninitializing and detaching the monitoring routines. If the answer is negative then stage 813 is followed by stage 809.

It should be noted that a web page can be rendered differently in different browsers or different operating systems or when there is a variation in system settings such as default font size.

Figure 9A:
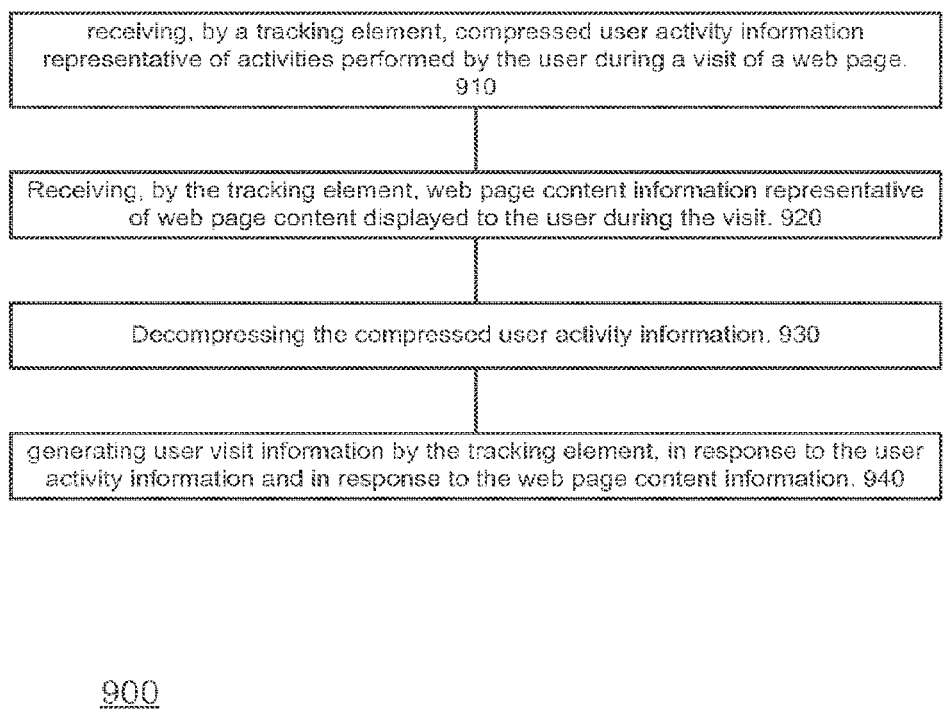

FIG. 9A illustrates method 900 for tracking activities of a user, according to an embodiment of the invention.

Method 900 starts by stages 910 and 920. Stage 910 includes receiving, by a tracking element, compressed user activity information representative of activities performed by the user during a visit to a web page. Stage 920 includes receiving, by the tracking element, web page content information representative of web page content displayed to the user during the visit. The tracking element can be a tracking system, a tracking server and the like.

Conveniently, stage 920 includes downloading the web page content information from an information source that provided web page information to the user during the visit of the user.

Conveniently, stage 920 includes downloading the web page content information from an information source that differs from an information source that provided to the user web page information the visit of the user.

Stage 910 is followed by stage 930 of decompressing the compressed user activity information.

Stage 930 is followed by stage 940 of generating user visit information by the tracking element, in response to the user activity information and in response to the web page content information.

Conveniently, stage 940 includes compensating for the difference between a visual representation, on a tracking display, of the web page and between a visual representation of the web page on another display. The compensating can be responsive to the relative locations of visual elements of the web page, can include applying a non-linear transformation on the visual representation, on the tracking display, of the web page, and the like. A more detailed explanation of the compensating will be provided in association with FIGS. 11A-11F.

Figure 9B:
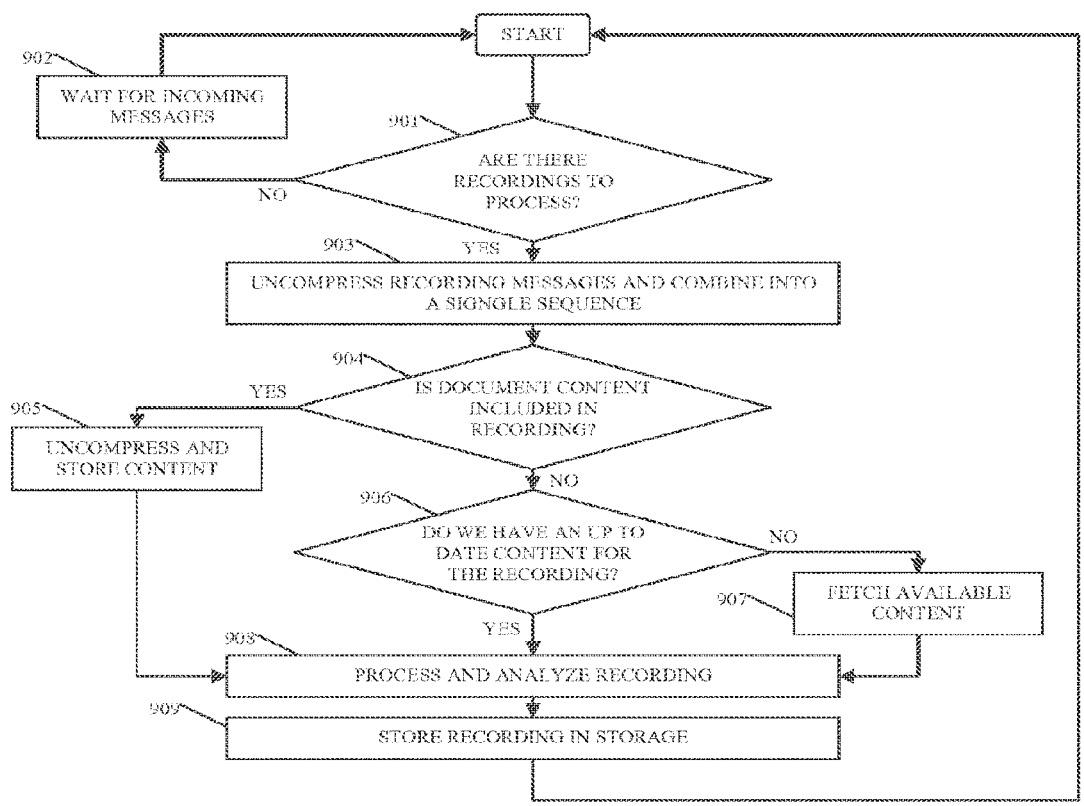

FIG. 9B illustrates method 900' for tracking activities of a user, according to an embodiment of the invention.

Method 900' starts by stage 901 of checking if there are any recordings (transmitted user activity information) to process. If the answer is positive, stage 901 is followed by stage 903 of uncompressing recording messages and combining them into a single sequence. Stage 903 can include processing messages that embed user activity information, sorting the user activity information in response to associated user identifier and session identifier and providing at least one sequence of user activity information that represents a session.

Stage 903 is followed by stage 904 of checking if a document content is included in the recording. The document content can include HTML markup code or text that was displayed to the user during the visit to a web page. If the answer is positive, stage 904 is followed by stage 905 of uncompressing the document and storing the uncompressed document. Stage 905 and stage 904 (if the answer is negative) are followed by stage 906 of checking if up to date web page content information is available.

Assuming the valid and up to date information is available, method 900' proceeds to stage 908 of processing and analyzing the recorded data (user activity information) to provide a visual representation of user activities and can store the visual representation of the user activities in a storage unit (stage 909) for playback. If the answer to query 906 is negative then stage 906 is followed by stage 907 of fetching available content. It is noted that stage 908 can include compensating for differences between the visual representation of information at the client display, at a playback display and the like.

Conveniently, tracking server 130 should compensate for difference between a visual representation, on a tracking display, of the web page and between a visual representation of the web page on another display.

It should be noted that absolute coordinates at the time of recording may not point to the correct location at the time of analysis or playback. Therefore, the coordinates should be either transferred in an invariant form (relative to elements in a web page) or it might be desired to transmit information about the elements in a web page in addition to events and event parameters. This information can include position data and properties of elements that will allow coordinate mapping to be performed at a later stage. Such information can be transferred initially about all elements or preferably it may be transferred on demand as elements become visible or active.

Conveniently, tracking server 130 can compensate for difference between a visual representation, on a tracking display, of the web page and between a visual representation of the web page on another display. Conveniently, the compensation is responsive to relative locations of visual elements (such as child elements included within other elements) of the web page. Conveniently, the compensation includes applying a non-linear transformation on the visual representation, on the tracking display, of the web page.

The compensation can include converting information representative of the position and size of visual elements that are displayed to the user (within the recording space). The conversion can be applied when the position and size of the visual elements that are displayed to the user differs from their representation on a playback monitor (within the playback space).

While tracking mouse movement events, the element that is underneath the mouse cursor (the mouse-active element) is also monitored. When there is a change in the mouse-active element, the tracking code will send element location (or element position) information to tracking server 130 including the position and size of the element, its location in the web page hierarchy as well as the size and position of its child elements.

When performing analysis of the user activities or a playback of the user activities, a parser will wait for element position data and by combining it with "recording-space" coordinates it will calculate invariant coordinates which are relative to position and size of the mouse-active element and its child elements. The playback element (such as subscriber computer 600 of FIG. 6) will use the hierarchy information to locate the mouse-active element from recording-space in playback-space, and then further take the invariant coordinates and convert them to absolute coordinates in playback-space using the position and size of the found element and its child elements.

It should be noted that child elements position and size are collected to correctly map the spaces between child elements and try to create a continuous coordinate mapping over the entire web page. Most value is achieved by collecting the position and size of child elements which are of "box" type as opposed to "inline" type. Such types of elements are known to those skilled in the art of web programming.

It should be noted that variation in web page hierarchal structure may occur as a result of browser differences, proxies and ad filters as well as other reasons. Such differences may cause difficulties in finding the correct mouse-active element or matching up recording-space and playback-space child elements of the mouse-active element. To overcome these difficulties, it is suggested to transfer element types together with the "element position" data. These types combined with element position are a better indication of an absolute element than just position. In cases when "element position" data fails to deliver a correct mapping, such as a result of severe web page variations, the parser may use the "element position" of a parent element if such information exists or fall back to absolute coordinates.

The position and layout of each visual element of a web page (hereinafter "visual element") can be different during playback from its position and layout during recording or during the visit of the user. Therefore there is need to map coordinates to provide the playback user with the correct mouse movement and click location.

A visual element is an area (such as but not limited to a rectangular area) of the web page that can include other elements. A visual element can be for example, a paragraph of text, a link, an image, a button and so forth. For each visual element, the mapping occurs on the areas where the visual element is not covered with one or more visual child elements.

Because of the existence of visual child elements, the area is not linearly mapped as a whole. Instead it can include a grid of shapes (such as rectangles) each linearly mapped, in a piece-wise-linear fashion.

Figure 11A:
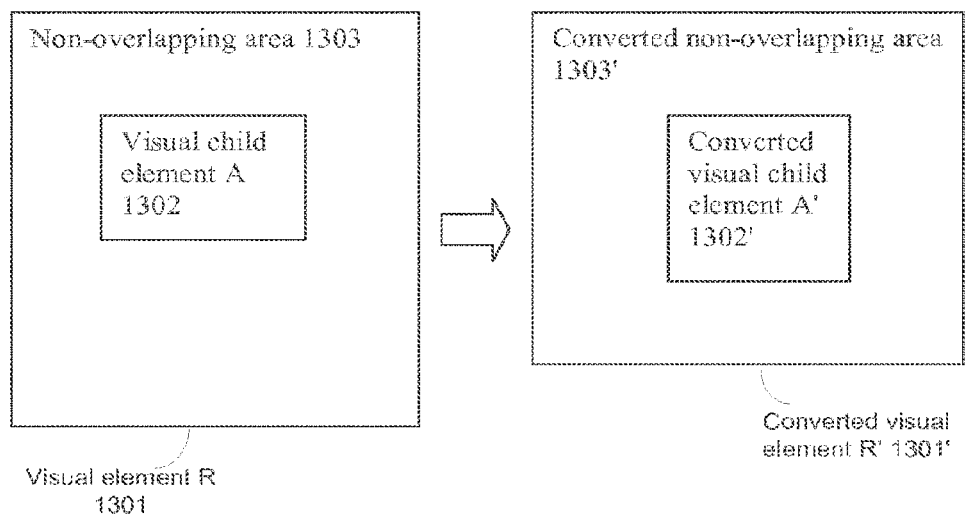
FIGS. 11A-11F illustrate various mapping operations between visual elements of a web page according to an embodiment of the invention.
Figure 11B:
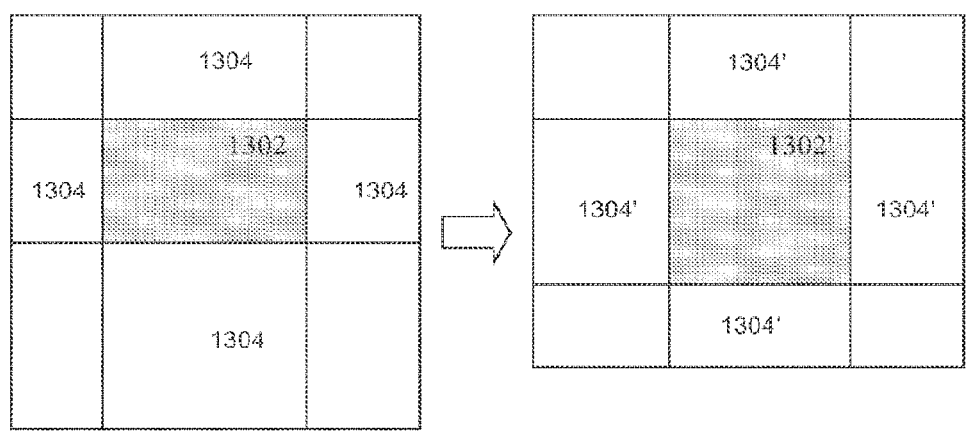

FIG. 11A illustrates visual element R 1301 that is being displayed on a tracking display and converted visual element R' 1301' that is being displayed on a playback display. Visual element R 1301 includes visual child element A 1302 and non-overlapping area 1303. Converted visual element R' 1301' includes converted visual child element A' 1302' and converted non-overlapping area 1303'. The converted non-overlapping area 1303' is made of cells that represent a linear conversion of cells of non-overlapping area 1303. FIG. 11B illustrates cells 1304 of non-overlapping area 1303 and cells 1304' of converted non-overlapping area 1303'.

Figure 11C:
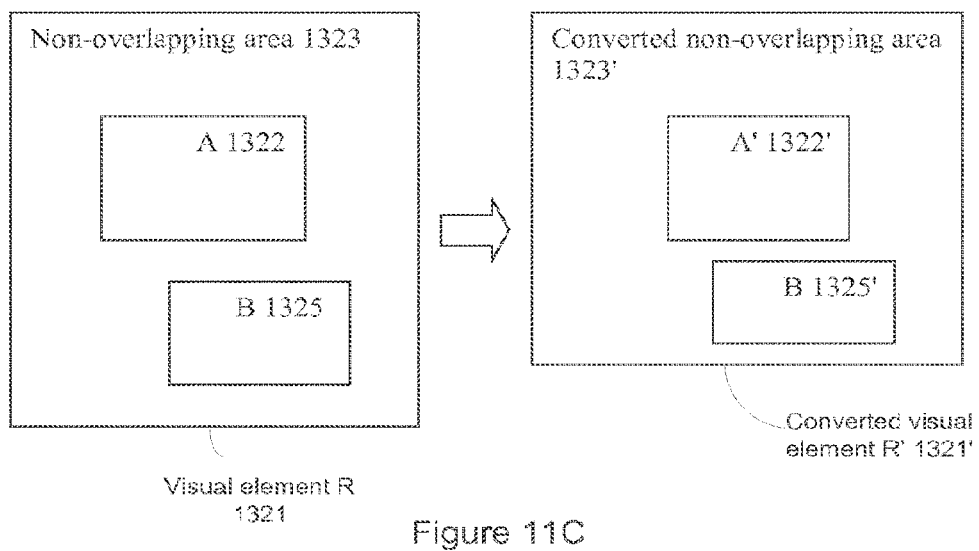
Figure 11D:
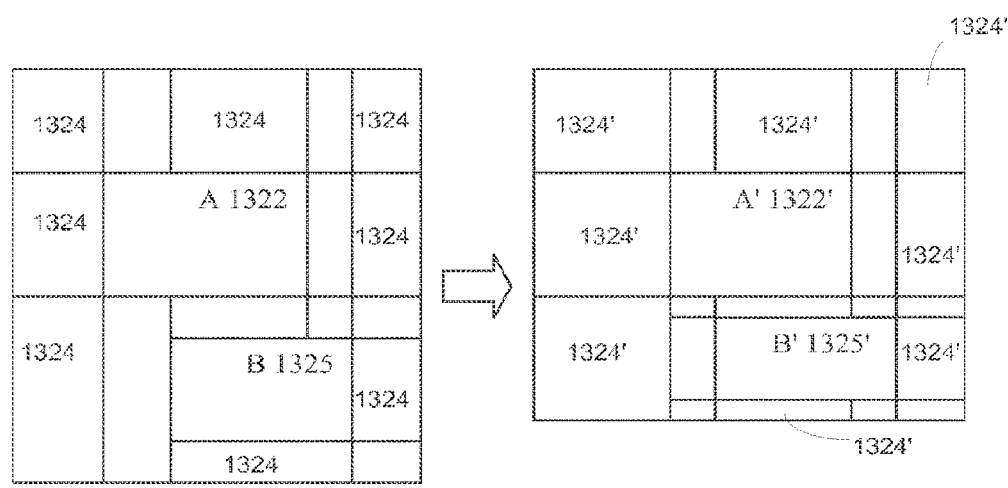

FIG. 11C illustrates visual element R 1321 that is being displayed on a tracking display and a converted visual element R' 1321' that is being displayed on a playback display. Visual element R 1321 includes first visual child element A 1322, second visual child element B 1325 and non-overlapping area 1323. Converted visual element R' 1321' includes converted visual child element A' 1322', converted second visual child element B' 1325' and converted non-overlapping area 1323'. The converted non-overlapping area 1323' is made of cells that represent a linear conversion of cells of non-overlapping area 1323. FIG. 11D illustrates cells 1324 of non-overlapping area 1323 and cells 1324' of converted non-overlapping area 1323'.

Figure 11E:
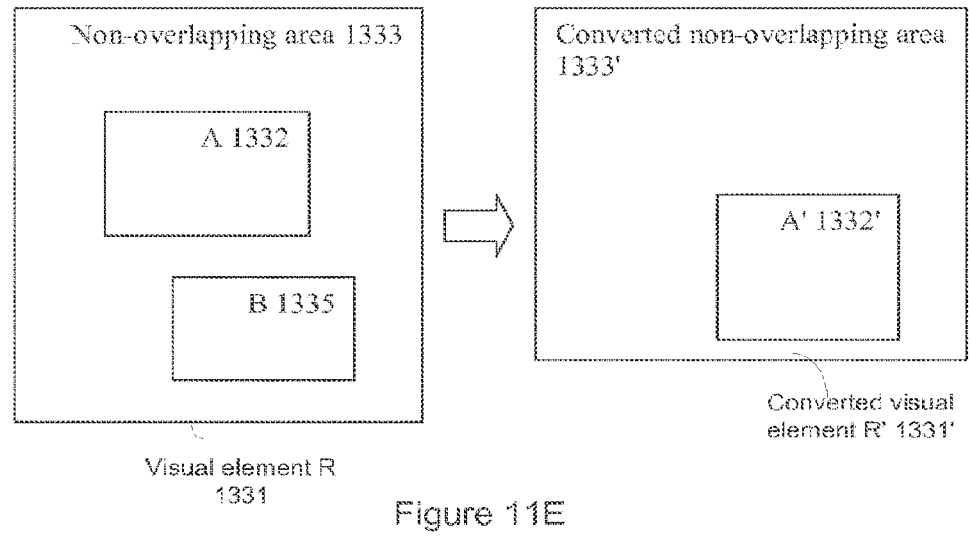

FIG. 11E illustrates visual element R 1331 that is being displayed on a tracking display and a converted visual element R' 1331' that is being displayed on a playback display. Visual element R 1331 includes first visual child element A 1332, second visual child element B 1335 and non-overlapping area 1333. Converted element R' 1331' includes converted visual child element A' 1332' and converted non-overlapping area 1333'.

Converted element R' 1331' does not include converted second visual child element B' 1335'. This can result from difference in browsers, advertisement blockers, changes in content and the like. The mapping will try to provide the optimal match between first and second web pages.

Figure 11F:
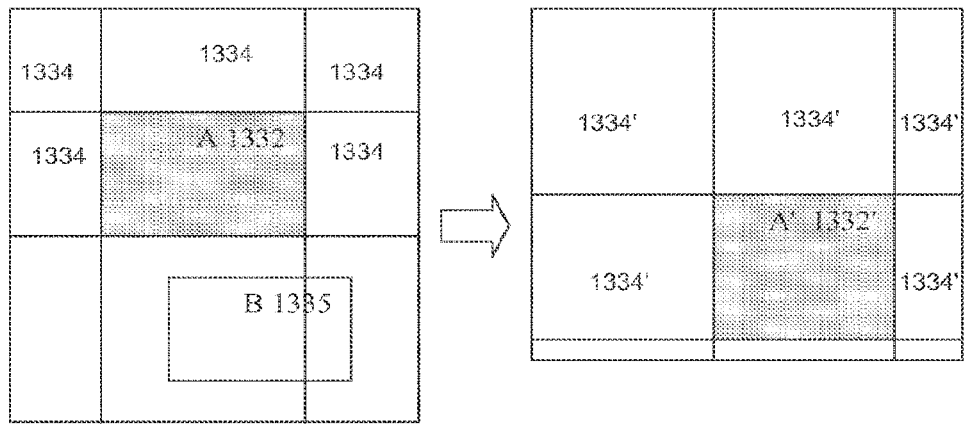

Converted non-overlapping area 1333' is made of cells that represent a linear conversion of cells of non-overlapping area 1333. FIG. 11F illustrates cells 1334 of non-overlapping area 1333 and cells 1334' of converted non-overlapping area 1333'.

It is noted that the mapping can include transmitting coordinates of the various cells and visual elements, and that the transmission can include transmitting X coordinates in separate from a transmission of Y coordinates.

The service operator may add special functions to script 132 that are designed to be called by script code of the subscriber that is embedded or referenced from web page 122. Such functions are known in the art as Application Programming Interface ("API") and may allow the subscriber to write custom code to integrate their own information into the stream of data that is sent for monitoring. For example, the subscriber may call a special function and state that the value of a custom field "UserID" is "123" or to label the current session as "UserDownloadedDemo". This custom information will be integrated by the service provider into the recording of the session for later analysis.

Once tracking starts, a random number is drawn and used to identify the session in the communication between the script 132 running in browser 102 and the tracking server 130. Such an identifier later allows matching separate messages that relate to the same session. It is also desired to know which separate sessions relate to the same user 804, since one user can visit several pages and create several sessions. It is paramount to know which sessions were generated by the same user as it allows the subscriber to track the behavior of a user throughout his entire visit to the web site. The easiest way to identify a single user is by using cookies. Again, a random number is drawn and assigned to a cookie which is kept on the computer of the client 100 by the browser 102. The value of the cookie is saved between sessions and allows identification of the user. Use of cookies is known to those skilled in the art. Alternatively, the following data can be used to find which sessions belong to the same user: ip, time proximity, click events, "cookies supported" browser capability, browser type, platform, time zone, etc.

If the subscriber requested that only certain users be tracked or that certain users will be tracked with a certain probability, then special considerations can be taken in respect to user identifying cookies. When a user without an identifying cookie ("id") is encountered, the user can be assigned a new id or, if tracking is not required, assigned a special id of 0 or other predetermined value. This procedure makes sure that the decision to track is only taken on a first session with a specific user. Otherwise it would be possible to start tracking a certain user in the middle of his visit rather than from the start, which is undesirable.

Tracking server 130 receives all the requests sent by script 132 from browser 102. It may process them right away or store them in memory, database, log file or any other media 134. Each request contains session identification, user identification and message identification. The tracking server 130 may monitor (stage 902) the messages in the media 134 for a set of messages (stage 901) that comprise a complete session or a set of messages that describe an incomplete session which has timed-out. Once such a set is found, a process of reconstructing the session may begin 903. The server will uncompress the messages using a process analogous to the compression process suggested before. A reconstructed session information 136 is saved (as illustrated by stage 909) in the storage media 134 for analysis or playback. Reconstructed session information 136 includes a visual representation of the user activities during a session.

Apart of recording interaction sequence data, it is desired to record the content of the web page (represented by web page content information) to capture the exact content of the page at the time the interactions took place. This is especially desired when the content of the web page is dynamically generated and differs depending on the time of the request or session parameters.

The web page content information can be retrieved by applying various techniques: (i) requesting the content of the same URL that the user has visited, (ii) requesting the content of an alternative URL that the subscriber provides, (iii) sending the data from the client side to the tracking server together with interaction sequences without requesting the data from the original server, and (iv) having the original server or a proxy server send a copy of the web page content to the tracking server when it is sent to the web visitor.

The first mentioned above technique can be selected for web pages that do not depend on session state or are not a result of a HTTP POST operation. Web page content that depends on session state, is a result of HTTP POST operation, or requires authentication information can be retrieved using the second to fourth above mentioned techniques.

While processing the recording, the tracking server will check (stage 904) if the web page content is part of the information that was sent (as it is the case when the third retrieval technique is used) and if so it will extract (stage 905) the content from the data. Otherwise, the tracking server will check (stage 906) if it already has an up to date version of the content already available as a result of caching or a previous fetches. If an up-to-date content is not available then the server will fetch (stage 907) an up to date version from the subscriber's servers.

The second technique is useful if the subscriber provides an alternative URL to the original web page, where such a URL is a HTTP GET URL and is not dependent on session state, time or POST variables. For example, if 'delete_user.php' is a HTTP POST page that is a function of a parameter called 'name' whose value in that case was 'Jon' then a subscriber can generate a command for the service operator to request the correct content from a URL called 'delete_user_render.php?name=Jon' which is a simple HTTP GET URL that will only render the correct response for the provider and not necessary perform any actual delete operation. Service provider may provide the subscriber with a list of IP addresses used by the provider's servers. Such an IP list can allow the subscriber to block all non-provider computers from gaining access to alternative URLs.

It is suggested that any content sent using the third technique is first encoded, compressed and then split into packets. Text encoding and compression techniques are well known to those skilled in the art of data compression.

The third technique can also be extended to send parts of the web page data so that changes to the web page as a result of DHTML or javascript code (as is the case with AJAX) can be recorded. Once the initial web page content is sent to the tracking server, the tracking code will perform one or more of the following actions: 1) install event handlers and monitor document changes as a result of event execution, such as onclick; 2) check for changes in the document at a recurring time period that can be constant or dynamic; or 3) wait for instructions via API calls to initialize a document change check. Once change is detected in the current content relative to the original content, the difference is encoded and sent to the tracking server in a way similar to sending the initial web page content.

The reconstructed session information 136 may be analyzed (as illustrated in stage 908), by itself or with other sessions of the same user or other users to result in information such as but not limited to: what parts of the page users see most (based on scrolling and window size data); how much time the user or users interact with the page as opposed to how much time the page was open (based on load, unload events versus mouse, scrolling, and keyboard events).

Furthermore, the subscriber may want to receive the reconstructed session information 136 to their own computer for any third-party processing. Service operator may provide such a service, perhaps for a fee, where the session will be available to the subscriber in some standard format, such as XML.

Figure 6:
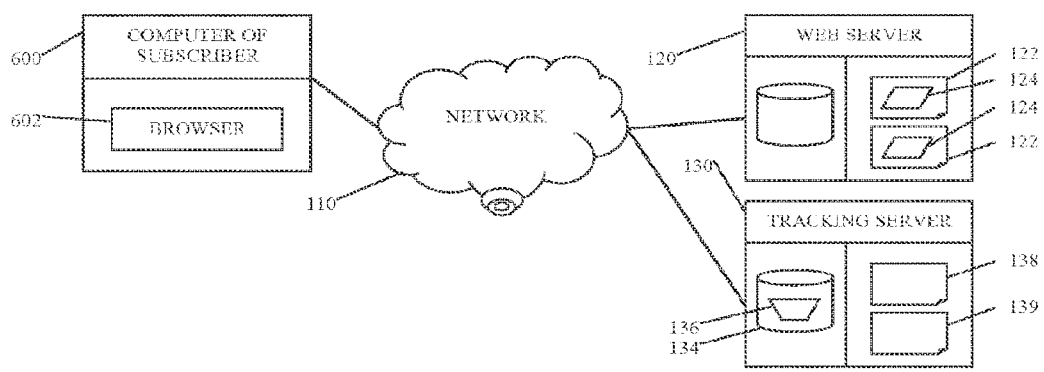
FIG. 6 illustrates a monitoring system and its environment, according to another embodiment of the invention.
Figure 10:
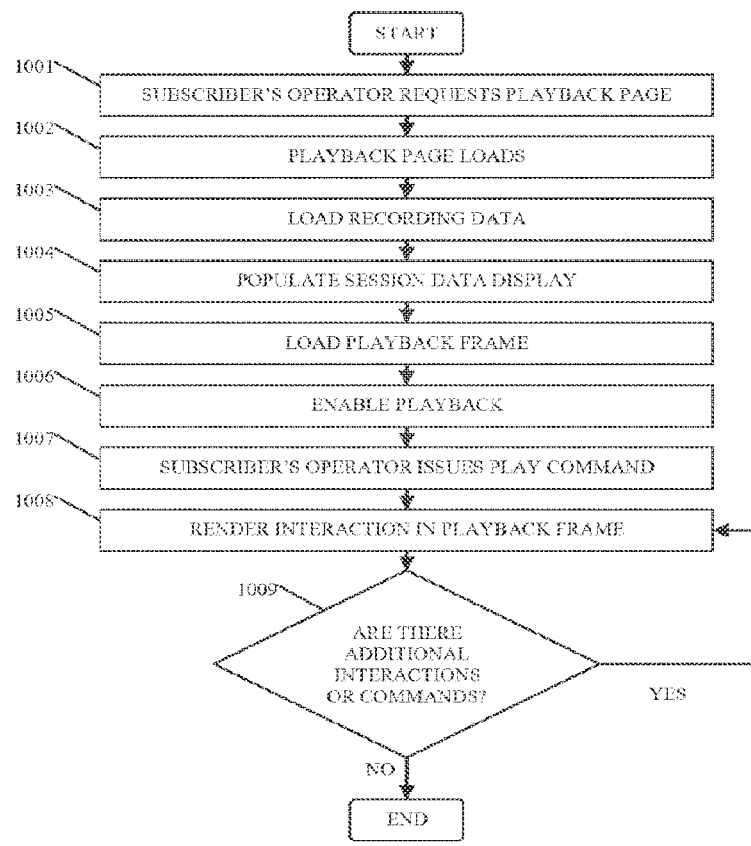
FIG. 10 illustrate a method for playing back recorded visits to a web site, according to an embodiment of the invention.

FIG. 6 illustrates monitoring system 130 and its environment, according to another embodiment of the invention. FIG. 10 is a flow chart 1000 of a method for playback of user visit at a web page.

FIG. 6 illustrates, in addition to tracking server 130, web server 120 and network 110, subscriber computer 600 that is also referred to as playback computer. The playback computer is connected to a playback display (not shown) on which visual representations of the visit of a user can be displayed. It is noted that the subscriber computer 600 can receive the relevant information from a server that differs from tracking server 130 and that tracking server 130 can operate as a playback server, but this is not necessarily so. It is further noted that each server can be replaced by another computerized platform.

Tracking server 130 stores reconstructed session information (visual representations of user activities during one or more sessions), and playback code such as playback script 139.

Conveniently, a subscriber logs-in from his subscriber computer 600 to a server of the service provider which could be the same server as the tracking server 130. Once logged in, the subscriber can see what sessions (represented by reconstructed session information 136) are available on the server. To ensure privacy, it is desirable that each subscriber can access only those sessions that were recorded from pages of the subscriber's domain. It is preferable if the sessions are grouped by users so that the subscriber could see available sessions of a specific user. Once a subscriber selects a specific session, playback can take place.

To perform playback, the browser of the subscriber 602 requests (as illustrated by stage 1001 of FIG. 10) user visit information such as playback of web page 138 from the tracking server 130. Playback of web page 138 is the web page that was displayed to the user during the session. It is represented by web page content information that can be retrieved in various manners.

Figure 7:
FIG. 7 illustrates an exemplary web page used to replay visits, according to an embodiment of the invention.

During this process a playback control screen can be displayed to the subscriber. FIG. 7 illustrates an exemplary playback control screen 700 according to an embodiment of the invention. Playback control screen 700 includes: playback controls portion 704, playback frame portion 706, and session data portion 702. Playback control portion 704 includes multiple symbols that control the manner in which a video stream representative of a session shall be displayed. It can include, for example "play", "pause", "stop", and "fast forward" items.

Playback frame portion 706 can display the web page content while session data portion 702 can display data about the session or the user (further explained in stage 1004). The preferable way to implement the playback frame is to use the <IFRAME> HTML tag as it provides the most flexibility. Other options for implementing the playback frame include using <FRAMESET> tags or directly embedding the html content of the frame inside the hosting web page.

Playback page 138 loads reconstructed session information 136 into the session data part of screen 700 and loads the relevant URL of the page to playback into the playback frame using the script 139.

According to an embodiment of the invention script 139 can manipulate the content of frame 706. According to another embodiment of the invention the content of the frame can be requested from a proxy or a cache located on the tracking server's domain. It is preferred to proxy only the html part of the page and request images and other external links from the original locations by adding a <BASE> tag to the proxied/cached page. In case of caching, the web page can be saved close to the time of the recording and therefore be invariant to future modifications of the web page.

Web page caching techniques are known to those skilled in the art of web programming, and may include reading HTTP header fields to determine when the page expires or when it was last updated. Such fields are, but not limited to, "Last-Modified", "ETag", "Expires", and "Cache-Control". In addition to the traditional methods of web caching, our method includes a means of detecting stage 906, whether a page has changed without contacting the original server. Comparing the checksums and hashes provided by the client-side tracking code to values of equivalent fields on already cached data, the caching server can determine whether it already cached the data in question and if possible skip the entire HTTP request to the original server.

Stage 1001 is followed by stage 1002 of loading the playback page. Stage 1002 is followed by stage 1003 of loading reconstructed session information 136. Stage 1003 if followed by stage 1004 of populating session data portion 702 of screen 700 (by data such as page URL, referrer URL, session duration, IP, browser type, country, language, time zone, etc.). Stage 1004 is followed by stage 1005 of displaying information representative of the reconstructed session at playback frame portion 706 of screen 700.

Stage 1005 is followed by stages 1006, 1007, 1008, and 1009 of controlling the playback by playback control symbols. The stages 1006, 1007, 1008, and 1009 may include enabling the playback, selecting a play symbol, and controlling the playback. Conveniently, during the execution of stage 1006, script 139 issues commands that affect the playback frame portion 706 and session data portion 702.

Commands generally take the form of calling DOM functions and changing DOM properties of the document in the frame 706, such techniques are known to those skilled in the art of web programming. For example, in response to a scroll event, script 139 can adjust the scrollTop and scrollLeft properties of the document to reflect the action. Mouse position can be simulated by a picture of a mouse cursor which is overlaid on top of the original web page. The subscriber can have the option to play the session, pause or stop playback, skip to next action, modify playback speed, and more. The subscriber can see "per-page" data and user data as well as playback data such as: current time and current action out of total time and total actions of the session, time left before next action, and the current playback speed.

While the above description contains many specificities, these should not be construed as limitations on the scope of the invention, but rather as an exemplification of one preferred embodiment thereof. Many other variations are possible, for example: other transfer protocol can be used besides http; The web page can be stored locally rather than on a web server; The document can be in a format other than html, such as xhtml or any other format which has a document object module and can contain scripts or macros that affect the document; Script languages other than javascript can be used, such as vbscript or equivalent; The script can be embedded inside an intermediary format or executable control such as Flash®; Network configurations may vary and can include a multitude of servers, either load balanced or divided into zones; A database may be located on a separate server if desired; Scripts can be external or embedded, and can be divided into several separate files if desired; It may be advantageous to store static scripts on a content distribution network rather than on the servers of the subscriber or service operator.

The present invention is directed towards providing a system for recording, analyzing and replaying actions that take place in a networked browser, while a user is interacting with a web page displayed in the browser. One part of the invention collects various client-side events and parameters and transmits them in an efficient manner to a server which can be different from the web server on which the web page is located. This data collection and monitoring is performed using client side script, and can be done without asking for affirmation from the user. One embodiment describes a system where the collected data is used to visually replay the interaction of the user with the web page. An alternative embodiment, describes a system where such data is used to analyze visits and traffic to uncover information not accessible by using prior art means.

The invention claimed is:

1. A method for tracking a user activity, comprising:
generating, by at least one processor, a user activity information representative of the user activity performed by a user on a web page displayed on a client display during a visit to the web page, wherein the user activity information comprises element location information of each element of the web page displayed to the user on the client display during the visit;
generating user visit information based on user activity information, wherein the user visit information comprises a visual representation of the web page displayed during the visit and the user activity performed by the user on the web page;
applying a non-linear transformation on a visual representation of the web page displayed on the client display, wherein applying the non-linear transformation comprises:
causing the visual representation of the web page displayed on the client display and the visual representation of the web page displayed on a playback display to comprise a grid of a plurality of shapes, and
mapping piece-wise-linearly the plurality of shapes in the visual representation of the web page displayed on the client display to the plurality of shapes in visual representation of the web page displayed on the playback display; and
causing the user visit information to be displayed on the playback display based on the non-linear transformation being applied.

2. The method of claim 1, further comprising:
converting the element location information into a first plurality of coordinates for each element in the web page, wherein the first plurality of coordinates are coordinates that are relative to a position and a size of each element in the web page displayed on the client display;
converting the first plurality of coordinates for each element in the web page to a second plurality of coordinates associated with a playback display for each element in the web page; and
causing the user visit information to be displayed on the playback display based on the second plurality of coordinates.

3. The method of claim 2, wherein converting the first plurality of coordinates to the second plurality of coordinates further comprises:
locating, in the visual representation of the web page displayed on the playback display, at least one element in the web page displayed on the client display, and
converting the first plurality of coordinates to the second plurality of coordinates using the position and the size of the located at least one element in the web page.

4. The method of claim 2, wherein the first plurality of coordinates are invariant coordinates for each element and the second plurality of coordinates are absolute coordinates associated with the playback display.

5. The method of claim 2, further comprising:
converting the element location information based on detecting differences between the client display and the playback display.

6. The method of claim 5, wherein detecting the differences between the client display and the playback display further comprises:
determining that the position or the size of at least one element in the visual representation of the web page displayed on the client display differs from the position or the size of the at least one element in the visual representation of the web page displayed on the playback display.

7. The method of claim 1, wherein the user activity information further comprises at least one event, wherein the at least one event comprises: loading, scrolling, moving a mouse cursor, clicking or selecting an element on the web page, resizing a window displaying the web page, activating a key on a keyboard or any combination thereof.

8. The method of claim 1, wherein the client display is separate from the playback display.

9. The method of claim 1, wherein at least one element of the web page displayed to the user on the client display is a hierarchical element, wherein the hierarchical element is associated with a child element that is caused to be displayed to the user on the client display in response to activation of the hierarchical element by the user.

10. The method of claim 9, wherein the element location information further comprises a hierarchy of each element of the web page displayed to the user on the client display during the visit, wherein the hierarchy of each element includes a location in a hierarchy of the web page.

11. The method of claim 10, wherein the element location information further comprises a position and a size of the child element associated the hierarchical element of the web page displayed to the user on the client display during the visit.

12. A non-transitory computer-readable medium having stored thereon instructions, when executed by a processor, causes the processor to perform operations for tracking a user activity comprising:
generating a user activity information representative of the user activity performed by a user on a web page displayed on a client display during a visit to the web page, wherein the user activity information comprises element location information of each element of the web page displayed to the user on the client display during the visit;
generating user visit information based on user activity information, wherein the user visit information comprises a visual representation of the web page displayed during the visit and the user activity performed by the user on the web page;
applying a non-linear transformation on a visual representation of the web page displayed on the client display, wherein applying the non-linear transformation comprises:
causing the visual representation of the web page displayed on the client display and the visual representation of the web page displayed on a playback display to comprise a grid of a plurality of shapes, and mapping piece-wise-linearly the plurality of shapes in the visual representation of the web page displayed on the client display to the plurality of shapes in visual representation of the web page displayed on the playback display; and causing the user visit information to be displayed on the playback display based on the non-linear transformation being applied.

13. The non-transitory computer-readable medium of claim 12, further comprising:

converting the element location information into a first plurality of coordinates for each element in the web page, wherein the first plurality of coordinates are coordinates that are relative to a position and a size of each element in the web page displayed on the client display;

converting the first plurality of coordinates for each element in the web page to a second plurality of coordinates associated with a playback display for each element in the web page; and causing the user visit information to be displayed on the playback display based on the second plurality of coordinates.

14. The non-transitory computer-readable medium of claim 13, wherein converting the first plurality of coordinates to the second plurality of coordinates further comprises:

locating, in the visual representation of the web page displayed on the playback display, at least one element in the web page displayed on the client display, and converting the first plurality of coordinates to the second plurality of coordinates using the position and the size of the located at least one element in the web page.

15. The non-transitory computer-readable medium of claim 13, wherein the first plurality of coordinates are invariant coordinates for each element and the second plurality of coordinates are absolute coordinates associated with the playback display.

16. The non-transitory computer-readable medium of claim 13, wherein the processor to perform the operations further comprising:

converting the element location information based on detecting differences between the client display and the playback display.

17. The non-transitory computer-readable medium of claim 16, wherein detecting the differences between the client display and the playback display further comprises:

determining that the position or the size of at least one element in the visual representation of the web page displayed on the client display differs from the position or the size of the at least one element in the visual representation of the web page displayed on the playback display.

18. The non-transitory computer-readable medium of claim 12, wherein the user activity information further comprises at least one event, wherein the at least one event comprises: loading, scrolling, moving a mouse cursor, clicking or selecting an element on the web page, resizing a window displaying the web page, activating a key on a keyboard or any combination thereof.

19. The non-transitory computer-readable medium of claim 12, wherein the client display is separate from the playback display.

20. The non-transitory computer-readable medium of claim 12, wherein at least one element of the web page displayed to the user on the client display is a hierarchical element, wherein the hierarchical element is associated with a child element that is caused to be displayed to the user on the client display in response to activation of the hierarchical element by the user.

21. The non-transitory computer-readable medium of claim 20, wherein the element location information further comprises a hierarchy of each element of the web page displayed to the user on the client display during the visit, wherein the hierarchy of each element includes a location in a hierarchy of the web page.

22. The non-transitory computer-readable medium of claim 21, wherein the element location information further comprises a position and a size of the child element associated the hierarchical element of the web page displayed to the user on the client display during the visit.

23. A system for tracking a user activity comprising:

a processor, and a memory storing instructions, when executed by the processor, causes the system to perform operations comprising:

generating a user activity information representative of the user activity performed by a user on a web page displayed on a client display during a visit to the web page, wherein the user activity information comprises element location information of each element of the web page displayed to the user on the client display during the visit;

generating user visit information based on user activity information, wherein the user visit information comprises a visual representation of the web page displayed during the visit and the user activity performed by the user on the web page;

applying a non-linear transformation on a visual representation of the web page displayed on the client display, wherein applying the non-linear transformation comprises:

causing the visual representation of the web page displayed on the client display and the visual representation of the web page displayed on a playback display to comprise a grid of a plurality of shapes, and mapping piece-wise-linearly the plurality of shapes in the visual representation of the web page displayed on the client display to the plurality of shapes in visual representation of the web page displayed on the playback display; and causing the user visit information to be displayed on the playback display based on the non-linear transformation being applied.

* * * * *

UNITED STATES PATENT AND TRADEMARK OFFICE
CERTIFICATE OF CORRECTION

PATENT NO. : 11,516,305 B2  
APPLICATION NO. : 17/689547  
DATED : November 29, 2022  
INVENTOR(S) : Arik Yavilevich Page 1 of 2

It is certified that error appears in the above-identified patent and that said Letters Patent is hereby corrected as shown below:

On the Title Page

On page 2, in Column 1, item (56) under "U.S. Patent Documents", Line 42, after "Yavilevich", insert --¶11,343,339 B1 5/2022 Yavilevich--

On page 3, in Column 2, item (56) under "Other Publications", Line 11, delete "Implict" and insert --Implicit-- therefor On page 3, in Column 2, item (56) under "Other Publications", Line 34, after "2011.", insert --¶"U.S. Appl. No. 16/931,064, Non Final Office Action dated Jul. 22, 2022", 7 pgs.
"IPR2021-00464, Pat. 7,941,525 B1, Final Written Decision entered Jul. 6, 2022", (Jul. 6, 2022), 47 pgs.
"Decision Granting Institution of Inter Partes Review entered Aug. 15, 2022", IPR2022-00476, Pat. 10,749,976 B2, (Aug. 15, 2022), 27 pgs.--

In the Drawings

Sheet 5 of 12, Fig. 8A, reference numeral 814, Line 1, delete "UNINTIALIZE" and insert --UNINITIALIZE-- therefor On sheet 8 of 12, Fig. 9B, reference numeral 903, Line 2, delete "SIGNGLE" and insert --SINGLE-- therefor In the Specification In Column 2, Line 13, delete "providers" and insert --provider's-- therefor In Column 5, Line 8, delete "FIGS. 1A-ID" and insert --FIGS. 1A-1D-- therefor In Column 5, Line 15, delete "invention:" and insert --invention;-- therefor Signed and Sealed this  
Seventeenth Day of October, 2023

Katherine Kelly Vidal  
*Director of the United States Patent and Trademark Office*

In Column 5, Line 18, delete "invention:" and insert --invention;-- therefor

In Column 16, Line 32, after "702.", delete a linebreak